United States Patent [19]

Eggenmüller et al.

[11] 4,046,068

[45] Sept. 6, 1977

[54] APPARATUS FOR FORMING MATS OR STRANDS OF FODDER FEED MATERIAL FOR FLAT STORAGE THEREOF

[75] Inventors: Alfred Eggenmüller, Ulm; Heinrich Bellan, Thalfingen; Lorenz Scherer, Oberelchingen; Eugen Notter, Senden; Werner Wagler, Wullenstetten, all of Germany

[73] Assignee: Gebruder Eberhard, Ulm, Germany

[21] Appl. No.: 471,278

[22] Filed: May 20, 1974

Related U.S. Application Data

[63] Continuation-in-part of Ser. No. 269,760, July 7, 1972, abandoned.

[30] Foreign Application Priority Data

July 10, 1971 Germany ................. 2134578

[51] Int. Cl.² .................. A01F 25/16; B65G 3/04
[52] U.S. Cl. .................. 100/65; 100/100; 100/145; 100/177; 100/189; 56/364
[58] Field of Search .......... 100/65, 100, 35, 144, 100/145, 155 R, 156, 172, 173, 174, 177, 188 R, 189, 103, 66; 214/17 C, 44 R, 83.3; 56/364, 345, 400.02

[56] References Cited

U.S. PATENT DOCUMENTS

| 998,544 | 7/1911 | Mosher | 56/400.02 |
|---|---|---|---|
| 1,911,535 | 5/1933 | Schultze | 56/400.02 |
| 2,157,261 | 5/1939 | Innes | 100/100 UX |
| 2,362,861 | 11/1944 | Russell | 100/100 UX |
| 2,381,620 | 8/1945 | Russel | 100/100 X |
| 3,218,786 | 11/1965 | Johnson et al. | 56/1 |
| 3,229,320 | 1/1966 | Cymara | 100/229 A |
| 3,252,277 | 5/1966 | Weichel | 56/364 X |

FOREIGN PATENT DOCUMENTS

20,387  1/1910  Denmark ................. 100/144

Primary Examiner—Peter Feldman
Attorney, Agent, or Firm—Silverman & Cass, Ltd.

[57] ABSTRACT

Apparatus for shaping fodder feed and the like for flat storage thereof and having a molding channel mounted upon an undercarriage and compression roller means disposed therein. The compression roller means includes a roller having a shaft provided with a plurality of rigid tines or teeth arranged progressively spiraled about the circumference thereof for almost the entire length of the shaft. Said teeth are arranged in two adjacent sets or groups, each set or group completing part of a circumscription of the shaft. The teeth are arranged to cooperate with a stripping basket formed of spaced metal strips. Each set of teeth may be divided into outer and inner ones relative the ends of the roller. The tips of the teeth in the inner group have a smaller angular displacement relative to the adjacent teeth when compared with the angular displacement of the outer teeth, which are adjacent the sides of the channel walls when the roller is installed.

Feeding means in the form of an oscillating slide are disclosed, said means being positionally and longitudinally adjustable. Guide or deflector means are provided cooperating with the molding channel, basket and roller to assure absence of gaps within the completed feed product formed.

22 Claims, 4 Drawing Figures

APPARATUS FOR FORMING MATS OR STRANDS OF FODDER FEED MATERIAL FOR FLAT STORAGE THEREOF

BACKGROUND OF THE INVENTION

This is a Continuation-in-Part application to my pending application, Ser No. 269,760 filed July 7, 1972, now abandoned.

The invention relates generally to apparatus for shaping dry fodder feed or silage to enable flat storage thereof and is particularly concerned with apparatus which achieves the formation of a continuous strand or mat of compacted feed material having a uniform density over its entire cross section so as to be suited for storage in flat layers in so-called flat silos.

DESCRIPTION OF THE PRIOR ART

Various methods of operation have become known for the storage or warehousing of agricultural feed products to be used as dry fodder, feed or silage for feeding livestock. After drying in the field, dried fodder is transported to a barn or other place of storage from whence it will be tansferred into the stable for feeding. Dried feed may be chopped either in the field or in the barnyard and stored as chopped feed. In any case, a barn or some other roofed storage area is required to provide storage and, in most cases, is erected in a costly construction. In the vast majority of agricultural establishments, livestock is fed dried feed as well as silage. Silo feed is prepared in high silos or in flat silos generally by fermentation of the fodder stored therein. High silos are constructed in most cases either in solid design or in some other expensive, loadbearing manner, and entail many problems in feeding thereto and removal therefrom of the silo feed.

Cognizant of these conditions, a flat silo has been disclosed in German Pat. No. 1,257,409 which, in contrast to high silos, is designed in solid stationary construction, resembling a tunnel in configuration. The silo feed is stuffed into this tunnel which has a bottom floor built on a smooth or sloping plane, the feed being fed through an opening by means of a slide. The feed is pressed differentially in relation to the length of the tunnel due to the friction generated during the stuffing thereof over the tunnel length so that the density required for satisfactory fermentation of the fodder during storage is unattainable over the entire length of the silo.

Another flat silo construction has been disclosed in the German patent publication 1,582,646. This silo construction comprises a cylindrical container positioned on supports. A piston press is arranged at one end of the container and presses the fodder through a relatively small opening into the container. This type of flat silo construction has a drawback in that the stationary container can absorb only a limited quantity of feed. In addition, a desired uniform compression of the feed is unattainable because the feed is passed through a small opening provided in the front wall of the container.

Another and greatly improved and simplified method for storage and fermentation of feed plants into silo fodder is proposed in accordance with German patent publication 1,816,405 where strands, or mats of feed can be produced of any length and deposited side by side without the need for any containers or silo constructions.

Another apparatus for forming strands of agricultural feed for flat storage thereof is disclosed in German Utility Patent No. 7,040,756. This construction comprises a press roller having a shaft provided with three groups of teeth. When the shaft revolves counter-clockwise, the two outer groups of teeth will initially feed the harvested material and then the group of teeth in the middle will do so.

However, since at any one time only one part of the teeth performs an operation, this causes high torque peaks requiring large dimensions. This also results in a batch-wise conveyance of the harvested material, i.e., first outside and then inside. Thus, the machine is loaded intermittently, and in addition, undesired breaks repeatedly occur in the flow of harvested material.

The principal object of this invention is to provide an apparatus for forming continuous elongate strands or mats of feed material in accordance with the method disclosed in German patent publication 1,816,405 and German Utility Patent No. 7,040,756, wherein uniform density is achieved over the entire cross section of said length of material.

SUMMARY OF THE INVENTION

An apparatus for forming strands, or mats of feed material for storage in flat layers, said apparatus comprising a molding channel mounted on an undercarriage, compressing means disposed within said molding channel and comprising a compression roller disposed in the lower part of said molding channel and extending over almost the entire width of the same, said compression roller having a plurality of rigid tines or teeth arranged spirally thereabout for almost its entire length, said teeth cooperating with a stripping basket. A guide plate is provided obliquely upwardly from the stripping basket and arranged in the molding channel.

One embodiment of the invention provides a compression roller comprising two sets or groups of teeth spirally placed circumferentially about the shaft of the roller, each set making part of a revolution progressively about the circumferenceof the shaft. The tips of the tines or teeth of each group or set are disposed so that those teeth which are disposed in the center of the molding or shaping channel have a smaller angular displacement or distance between adjacent teeth than the teeth located closely adjacent the side walls of the molding channel close to the ends of the roller.

Means are provided to avoid formation of gaps or separations in the feed stock produced. Further, the feed means to introduce the fodder to the compressing roller means comprises an oscillating slide disposed preceding said compressing means. The oscillating slide is operable by means of a crank drive directly connected to the shaft of the compression roller, the position of the slide with reference to the compression roller means being positionally and longitudinally adjustable.

DESCRIPTION OF THE DRAWINGS

FIG. 5 is a fragmentary perspective view of the stripping basket.

DESCRIPTION OF THE PREFERRED EMBODIMENTS

Figure 1:
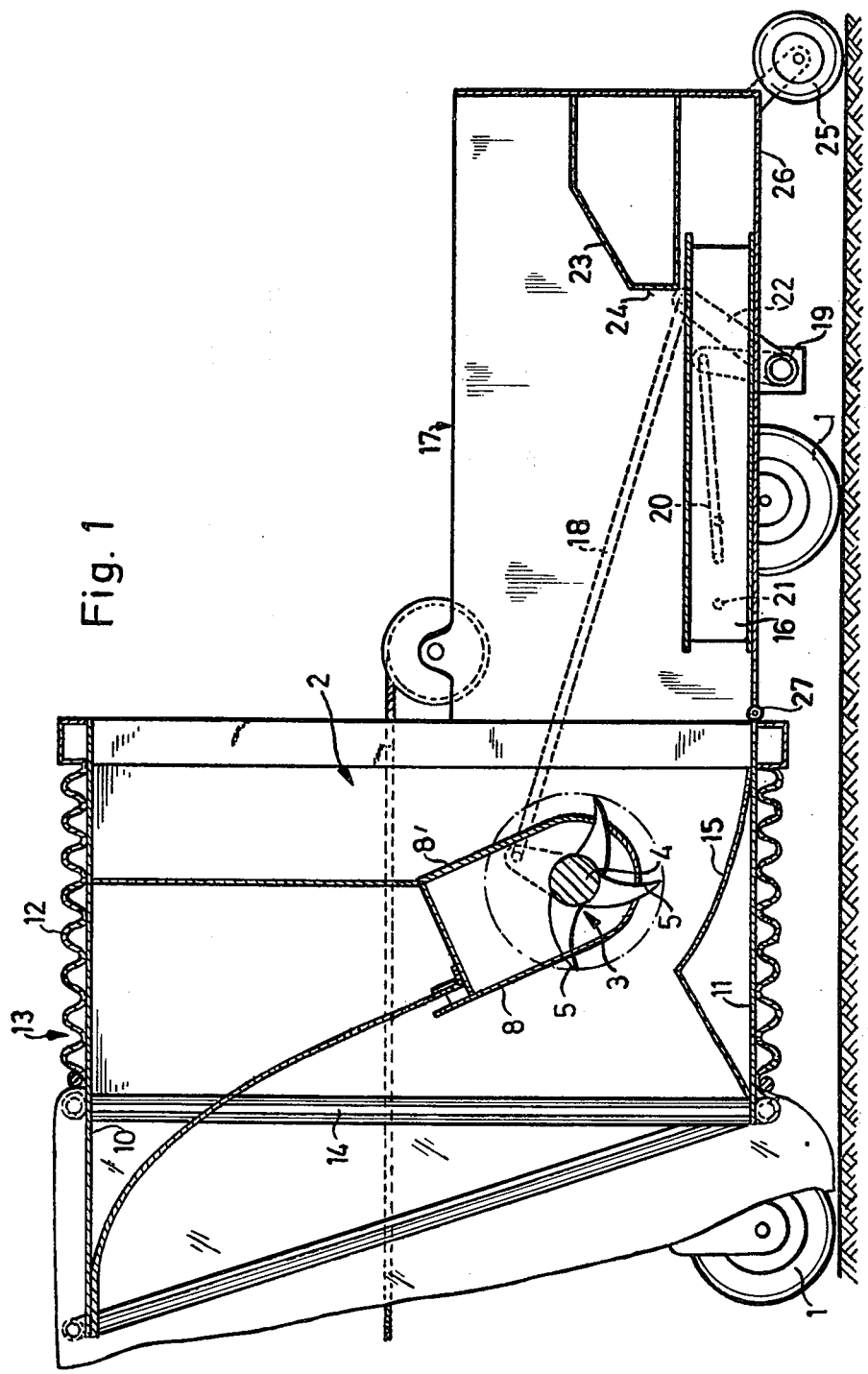
FIG. 1 is a side elevational view of the apparatus according to the invention with portions thereof being shown in section.

Referring now to the drawings, in FIG. 1 there is illustrated the feed stock forming apparatus according to the invention comprising compression means including a pressing roll 3 having teeth or tines 5 rigidly and spirally arranged on a shaft 4, said pressing roll being arranged in a molding channel 2, and adapted to rotate in clockwise direction as seen in FIG. 1 and Marked I'. The channel 2 is portably mounted on an undercarriage supported on wheels 1.

The press roll 3 is positioned in the lower part of the molding channel 2 and is provided over the entire width with tines or teeth 5. The teeth 5 are arranged spirally on the shaft 4 in two groups or sets, 6 and 7 respectively.

Figure 2:
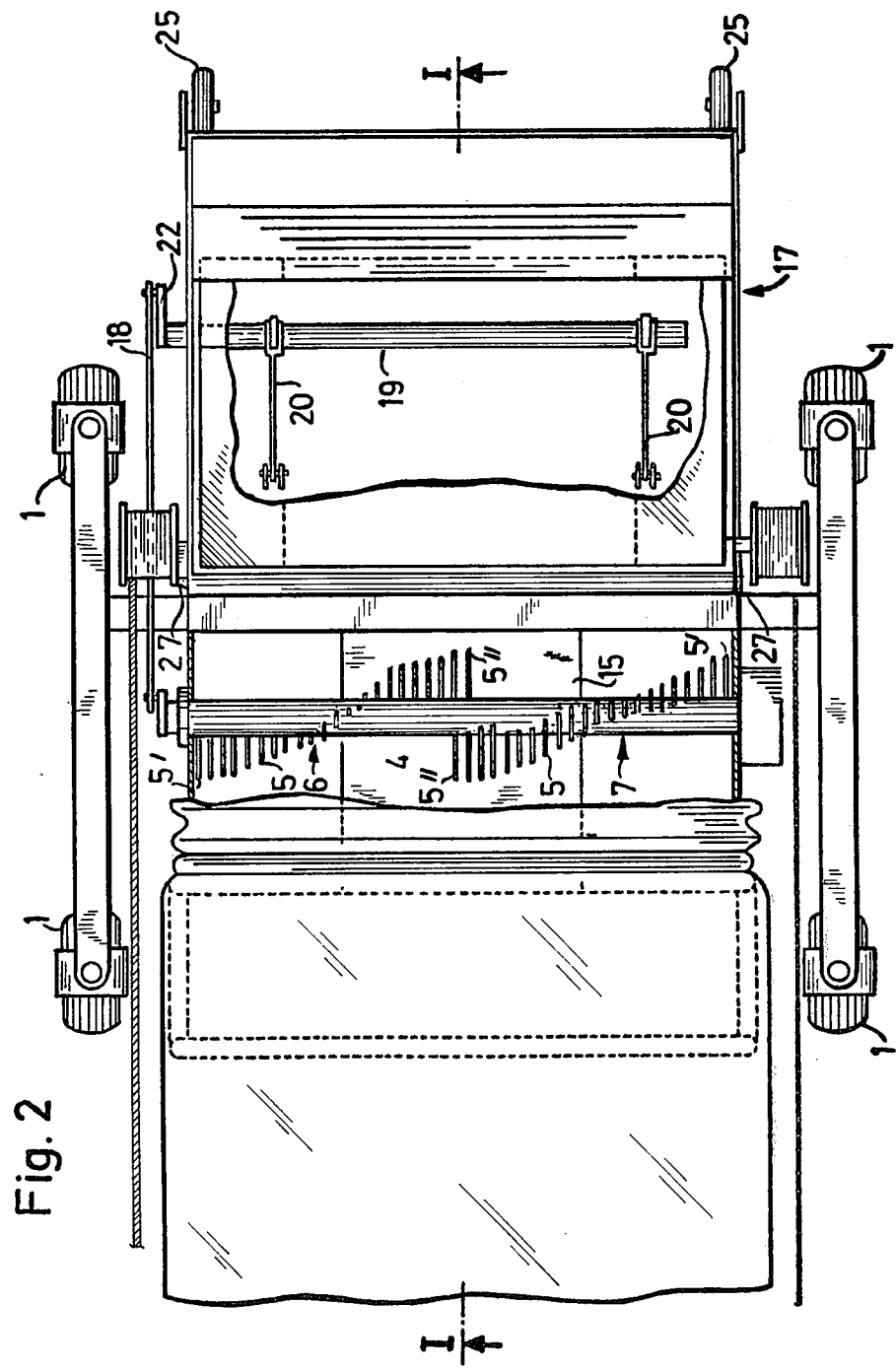
FIG. 2 is a plan view of the apparatus of FIG. 1, portions of which are broken away to show interior detail.

As seen in FIG. 2 of the drawings the teeth 5 of sets 6 and 7 extend inwardly from without in helical lines. Tines 5 of set 7 start at the outside with tine 5' directed toward the right hand as viewed in FIG. 2, extending into tines 5 toward the mid-portion of the shaft, ending up with tine 5" which is directed toward the left. On the other hand, in set 6, the first tine 5' is directed toward the left hand, tines 5 joining up such as to pass below the shaft 4 toward the right hand. Accordingly, in the middle portion of the set 6 the tines 5, not being visible, are shown in dash-line. Viewing set 7, with the direction of rotation as indicated, the outside tine 5' of the set 7 will act first before the trailing inside tine 5" of the set 7 comes to act. Analogously, in set 6, viewed upon a revolution through 180°, it will likewise be tine 5' of set 6 which acts first before the inside tine 5" of set 6 comes to act upon further revolution through a certain angle.

Figure 3:
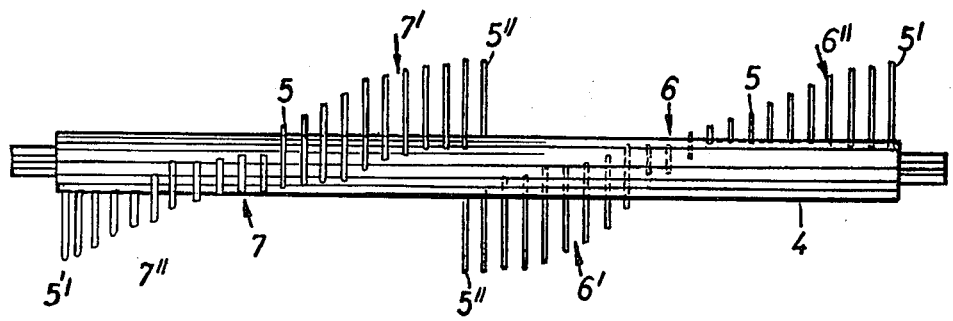
FIG. 3 is a schematic representation illustrating the arrangement of the teeth or tines upon the pressing roller as shown in FIGS. 1 and 2.

Explaining it in different terms an inspection of FIG. 3 indicates that if the shaft is rotating in a clockwise direction, the teeth 5' of set 6 and the forwardmost tooth 5" of set 7 will act on the material before the rearward outer tooth 5' of set 7. It will be appreciated that such structure will cause material fed into the working portion of the device to move from the sides of the chamber toward the center somewhat in the manner of an opposed flight auger.

Figure 4:
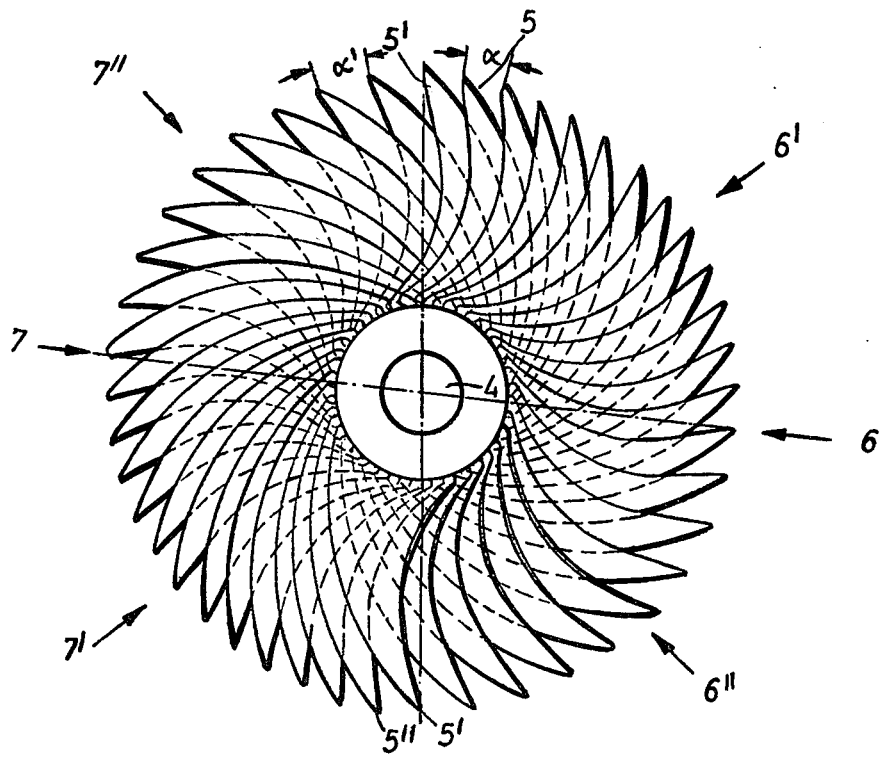
FIG. 4 is an enlarged end view of the pressing roller illustrating the arrangement of individual tines or teeth thereupon.

Moreover, the teeth 5 are distributed on the shaft 4, as viewed in the longitudinal direction of the shaft, see FIG. 4, at the periphery of the shaft, so that the tips of the teeth of the inner half 6' and 7' of the corresponding sets of teeth show smaller angular displacements of distances between the adjacent teeth than the tooth groups or sets 6' and 7' disposed adjacent the opposite ends of the roller which are disposed closer to the walls of the channel. This difference in angular displacements becomes evident when comparing the angle α with the angle α' in FIG. 4.

In order to avoid a separation or gap in the feed stock formed in the center portion of the channel by the division or staggering of tooth groups, the teeth are so arranged that one tooth 5" of the group of teeth 6' overlaps one tooth 5" of the other tooth group 7' at its midportion as viewed in a radial direction (see FIGS. 3 and 4).

The teeth 5 of the press roll 3 are arranged to cooperate with a stripping basket 8 as indicated in FIG. 1. A fragmentary perspective view of the stripping basket is illustrated in FIG. 5. The stripping basket 8 comprises a number of U-shaped sheet metal strips 31 arranged side by side. There are gaps 33 between adjacent strips 31 each permitting one tine 5 to pass through the gap 33, as readily apparent in FIG. 5. The front ends of the U-shaped metal strips are rigidly connected to define the basket which is secured to side walls of the molding channel 2. The sheet metal strips 31 are connected on the rear side by upward bridges with the frame of the molding channel 2. To avoid any formationof gaps or bridges during feeding, and so that the teeth grip at an earlier moment into the arriving material, the front portion 8' of the basket has a direction oriented rearwardly as shown in FIG. 1. A dotted line 37 indicates a position of the basket if it were not oriented rearwardly. In that event the teeth would grip the material at a point 39. However, with the basket in the rearwardly inclined position, the material is gripped by the teeth earlier, i.e. at a point 41.

A guide panel or deflector 9 is an arc-shaped metal member oriented obliquely upwardly from the stripping basket 8. Delivery of the feed by the compression roller into the space behind the basket 8 is effected obliquely upwardly in direction of arrow II'. The feed will gradually build up in compacted form. The guide panel 9 serves to orient the feed material obliquely upwardly toward the rear. A sausage-like body is horizontally formed on the ground, such body being enclosed by a collapsible bag 12. Due to the resulting pressure, the entire apparatus bearing against the horizontal sausage body on the ground is gradually moved toward the right, as shown in FIG. 1.

The roof 10 of the forming channel 2 is designed to extend rearwardly beyond the end of the bottom 11 of the forming channel, i.e., to the left in FIG. 1 so that the surface of the feed stock, that is the elongate strand, or mat of material becomes more uniform, and gaps or bridge formations of the material therewithin is reduced. It will be noted that the top cover 10 defines an upper cover plate which absorbs the upward pressure. Also, the top cover 10 in combination with the bottom plate 11 define an opening 13, over which the collapsible bag or receiver 12 is drawn up. As the apparatus as seen in FIG. 1 is moving toward the right under the action of the pressure exerted by the horizontal sausage-like body of silage on the ground, the collapsible bag is gradually drawn off said opening 13 to enclose the resulting sausage-like body of silage material It is expedient in this respect, for the support means 14 and 60 of the collapsible bag 12 to be arranged in a vertical position relative to the opening 13 of the molding channel. The collapsible bag 12 is arranged over the opening 13 so as to receive the material as it is discharged therefrom. The vertical positioning of the holding or support means 14 therefor is intended to facilitate uniform removal of the collapsible bag.

Feeding the material is further improved by arranging an arc-shaped guide deflector or panel 15 on the bottom 11 of the forming channel 2. The panel 15 extends only over the central area relative to the width of the forming channel. In more detail, the guide panel 15, as seen in FIG. 1, extends obliquely upwards in an arc such as to constrict the cross-sectional area of passage it defines in combination with the stripping basket 8 such as at 43. The compression roller 3 transports the feed material gradually through such constricted cross-sectional area 43, and a compressing effect upon the material is produced. From the apex 45, the guide panel slopes rearwardly to the bottom plate 11. Thus, the guide panel 15 aids in conveying the feed material in an obliquely upward direction, whereupon the material will advantageously tend to drop upon the preceding material.

It is to be noted that into the feed means or collecting hopper 17 comprising lateral walls and a bottom, the material to be ensilaged, e.g. grass or hay, is discharged in heaps. The device for feeding the material collected in such hopper toward the compression is a reciprocating slide 16 supported on the bottom. The slide 16 is suitably guided at the side walls for reciprocating oscillation by means of guide members, which being conventional, are neither shown nor described. Such members could be provided in the form of a dovetail-type guide. The reciprocating oscillation of the slide 16 is effected by a crank drive. To this effect, an eccentric lever 50, see also FIG. 2, is mounted on the shaft 4 to rotate clockwise in right connection with the shaft 4. A rod 18 is connected to said eccentric lever, the opposite end of said rod being connected with a lever 22 mounted on a rotary tube member 19. Said lever 22, together with the tubular member 19, performs a reciprocating oscillation as the shaft 4 rotates in clockwise direction. Two short levers 51 mounted on the rotary tube member 19 are connected to rods 20 which are secured to the slide 16. The levers 51 likewise perform oscillating movements which, by way of the rods 20, shift the slide 16 toward the compression roller 4 and away therefrom.

The rods 20 may be connected to the slide 16 at one of a plurality of junction points 21. Thus, the starting position of the slide 16 relative to the compression roller 4 is adjustable. Moreover, the angle of attack of lever 22 is adjustable, e.g. by means of a set screw on the hub of lever 22, which hub is provided on the tubular member 19, so that upon release of the set screw the lever 22 is adjustable in its angular orientation relative to the tube member 19. Moreover, the lever 22 is also longitudinally adjustable so as to increase or decrease the angle the lever 22 describes by its reciprocating oscillation. Accordingly, the stroke of the slide 16 is increased or decreased. This is of advantage where more or less of the material is to be conveyed to the compression roller 4 according to the type of feed material to be ensilaged. Such adjustability is obtained by a plurality of junction points for the rod 18 on the lever 22, such as indicated in FIG. 1 of the drawings.

The rear part of the slide, facing away from the pressing roller means 3 is covered over its top by a suitable plate 23 or the like. The front edge 24 of cover 23 is designed as a retaining wall for the material to be conveyed.

By analogous, i.e., conventional measures such as for example, by adding a corresponding support (not shown in the drawing), the effective height of the slide can be adjusted. In that case, the cover 23 likewise must be set higher.

The feeder is connected in an articulated manner with the molding channel 2 as shown at 27 and is supported via supporting wheels 25 against the ground. For feeding or transportation, the feeder can be pivoted upward about the articulated location 27.

The molding channel is substantially of rectangular cross-section, such cross-section being rounded off towards the top. The molding channel is rigidly connected to the vertical framework 60, with the feeding apparatus 17 being attached to the framework.

The molding channel 2, comprising members 9, 8 and 15 serves to shape the contour of the silage stock to be formed on the ground, i.e. it serves to determine the cross-section of the sausage-like body of silage stock.

In operation, feed material is placed in the feeder 17 from where it is moved by slide 16 towards the compression roller 3. The roller 3 moving in clockwise direction as seen in FIG. 1 presses the material through the narrow area 43 upwardly where it is guided by the panel 9 into the collapsible bag 12 where it may fall upon preceding material.

Thus a continuous strand of agricultural feed stock is formed in the shape of a flat mat or "sausage" by pressing the material against a stationary wall by means of the compression roller. In doing so, the compression roller gradually moves away from the stationary wall, so that a flat "sausage" is formed on the ground. The continuous strand or "sausage" may either be uncovered or may be covered from the beginning with the collapsible bag or continuous foil.

Considerable variation can be made in the apparatus without departure from the spirit or scope of the invention as defined in the appended claims.

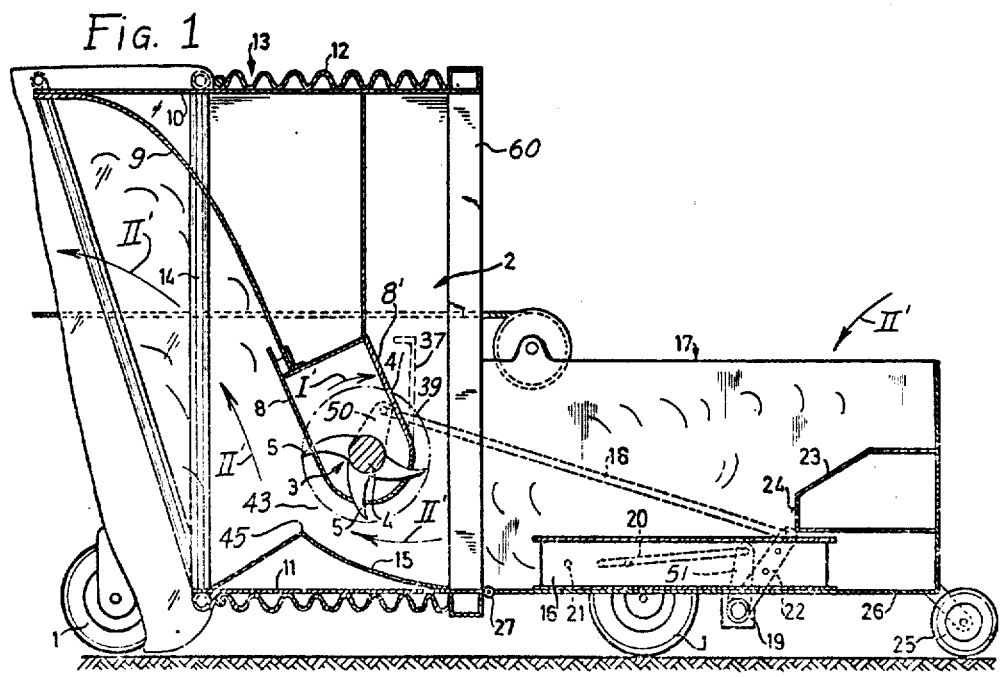

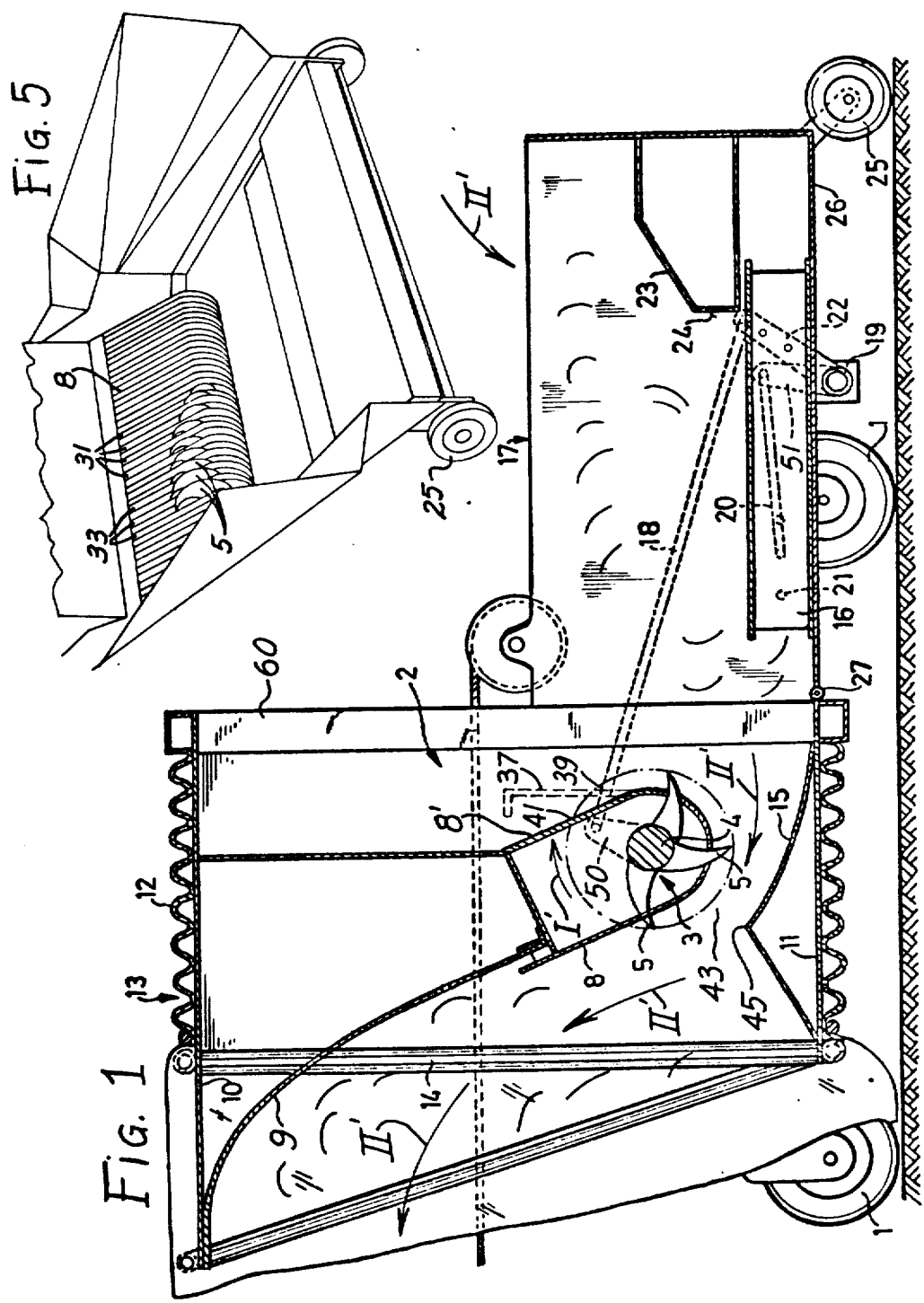

What is claimed and desired to be secured by Letters Patent of the United States is:

1. Apparatus for forming a continuous strand or mat of agricultural feed stock for storage thereof in flat layers, said apparatus including an undercarriage, a movable molding channel mounted to said undercarriage, compression means arranged in said molding channel comprising a roller extending almost across the full width of said channel, a plurality of teeth secured circumferentially on said roller along the length thereof, a stripping basket arranged in the lower part of said channel and operatively associated with said roller, upper and lower guide plate means mounted in said channel for guiding said feed stock which is pressed by said roller towards a stationary wall, said teeth being arranged along helical lines on the press roller, and the roller being supported within said stripping basket.

2. The apparatus according to claim 1 in which said teeth are arranged in a pair of sets.

3. The apparatus according to claim 2 in which said teeth of said sets each have terminal tips and the tips of those teeth which are disposed near the center of the molding channel have a smaller angular displacement relative to their adjacent teeth than those teeth of said sets which lie adjacent the ends of the roller and are disposed near the channel walls.

4. The apparatus according to claim 2 in which each tooth set has inner and outer halves and the tips of the teeth of the inner half of said respective tooth set have a smaller angular displacement relative to their nearest neighboring teeth than the outer half of the respective tooth set.

5. The apparatus according to claim 2 in which the relative angular displacement of the tooth tips to their nearest neighboring teeth decreases progressively from the opposite ends of said roller toward the middle.

6. The apparatus according to claim 1 in which the teeth are arranged to enable the teeth closer to the opposite ends of said roller to become effective before the inner teeth.

7. The apparatus according to claim 2 in which at least one tooth of one tooth set overlaps a portion of another tooth in the other tooth set when viewed radially.

8. The apparatus according to claim 1 in which said stripping basket is formed of individual strips of flashing and upright slanting bridges connecting said strips along one edge of said stripping basket to the frame of the molding channel.

9. The apparatus according to claim 8 in which the stripping basket is oriented canted to open toward the rear of said molding channel.

10. The apparatus according to claim 1 in which the molding channel has a roof and a floor, the lower guide plate means including a bow-shaped guide plate which is arranged in said molding channel and extends in width over a portion of the width of said molding channel in the central area thereof.

11. The apparatus according to claim 10 in which the roof of the molding channel projects outwardly toward the rear of said channel over said floor.

12. The apparatus according to claim 1 including a collapsible bag, means for attaching said bag to said molding channel over the opening thereof, said means comprising supports arranged in a vertical position.

13. The apparatus according to claim 1 including feed means secured to said undercarriage for feeding agricultural produce material to said compression means, said feed means comprising a slider, said slider being capable of reciprocation and arranged at the inlet portion of said compression means.

14. The apparatus according to claim 13 and drive means associated with the shaft of the roller including a crank gear for driving the slider directly from the roller.

15. The apparatus according to claim 14 in which said crank gear is arranged on one side only of the roller, including stabilization means coupled to said slider to prevent possible tipping, said stabilization means including a torsion bar and push rod means.

16. The apparatus according to claim 15 including means for adjusting said crank gear.

17. Apparatus according to claim 16 including means for adjusting the position of the slider relative to the compression roller means.

18. Apparatus according to claim 16 and shield means at the rear portion of said slider and directed outward from said compression roller means.

19. Apparatus according to claim 18 in which said shielding means includes a front wall formed as a retaining wall for the material being processed.

20. Apparatus according to claim 16 including means for adjusting the effective height of said slider.

21. The apparatus according to claim 16 including means for coupling said feed means vertically movable relative to said molding channel and support means secured to said feed means and comprising support wheels.

22. Apparatus according to claim 16 including a pivot connection between said molding channel and said feed means to enable upward pivotal movement of said feed means relative to said molding channel to facilitate transport of said apparatus.

* * * * *

UNITED STATES PATENT OFFICE
CERTIFICATE OF CORRECTION

Patent No. 4,046,068           Dated September 6, 1977

Inventor(s) Alfred Eggenmuller et al.

It is certified that error appears in the above-identified patent and that said Letters Patent are hereby corrected as shown below:

The portion of the term of this patent subsequent to May 6, 1993 has been disclaimed.

*Signed and Sealed this*

*Fourteenth* Day of *February 1978*

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,046,068

DATED : September 6, 1977

INVENTOR(S) : Alfred Eggenmuller, et al

It is certified that error appears in the above–identified patent and that said Letters Patent are hereby corrected as shown below:

The title page should be deleted to insert the attached title page therefor.

Sheet 1 of 3 of the drawings should be deleted to insert the attached sheet 1 of 3 therefor.

Signed and Sealed this

Third Day of July 1979

[SEAL]

Attest:

Attesting Officer

LUTRELLE F. PARKER

Acting Commissioner of Patents and Trademarks

United States Patent [19] [11] 4,046,068
Eggenmüller et al. [45] Sept. 6, 1977

[54] APPARATUS FOR FORMING MATS OR STRANDS OF FODDER FEED MATERIAL FOR FLAT STORAGE THEREOF

[75] Inventors: Alfred Eggenmüller, Ulm; Heinrich Bellan, Thalfingen; Lorenz Scherer, Oberelchingen; Eugen Notter, Senden; Werner Wagler, Wullenstetten, all of Germany

[73] Assignee: Gebruder Eberhard, Ulm, Germany

[21] Appl. No.: 471,278

[22] Filed: May 20, 1974

Related U.S. Application Data

[63] Continuation-in-part of Ser. No. 269,760, July 7, 1972, abandoned.

[30] Foreign Application Priority Data

July 10, 1971 Germany ............................ 2134578

[51] Int. Cl.² .......................... A01F 25/16; B65G 3/04
[52] U.S. Cl. ................................ 100/65; 100/100; 100/145; 100/177; 100/189; 56/364
[58] Field of Search ................ 100/65, 100, 35, 144, 100/145, 155 R, 156, 172, 173, 174, 177, 188 R, 189, 103, 66; 214/17 C, 44 R, 83.3; 56/364, 345, 400.02

[56] References Cited

U.S. PATENT DOCUMENTS

| 998,544 | 7/1911 | Mosher | 56/400.02 |
|---|---|---|---|
| 1,911,535 | 5/1933 | Schultze | 56/400.02 |
| 2,157,261 | 5/1939 | Innes | 100/100 UX |
| 2,362,861 | 11/1944 | Russell | 100/100 UX |
| 2,381,620 | 8/1945 | Russel | 100/100 X |
| 3,218,786 | 11/1965 | Johnson et al. | 56/1 |
| 3,229,320 | 1/1966 | Cymara | 100/229 A |
| 3,252,277 | 5/1966 | Weichel | 56/364 X |

FOREIGN PATENT DOCUMENTS 20,387  1/1910  Denmark ............................ 100/144

Primary Examiner—Peter Feldman
Attorney, Agent, or Firm—Silverman & Cass, Ltd.

[57] ABSTRACT

Apparatus for shaping fodder feed and the like for flat storage thereof and having a molding channel mounted upon an undercarriage and compression roller means disposed therein. The compression roller means includes a roller having a shaft provided with a plurality of rigid tines or teeth arranged progressively spiraled about the circumference thereof for almost the entire length of the shaft. Said teeth are arranged in two adjacent sets or groups, each set or group completing part of a circumscription of the shaft. The teeth are arranged to cooperate with a stripping basket formed of spaced metal strips. Each set of teeth may be divided into outer and inner ones relative the ends of the roller. The tips of the teeth in the inner group have a smaller angular displacement relative to the adjacent teeth when compared with the angular displacement of the outer teeth, which are adjacent the sides of the channel walls when the roller is installed.

Feeding means in the form of an oscillating slide are disclosed, said means being positionally and longitudinally adjustable. Guide or deflector means are provided cooperating with the molding channel, basket and roller to assure absence of gaps within the completed feed product formed.

22 Claims, 4 Drawing Figures